United States Patent
Edge et al.

(10) Patent No.: US 9,619,128 B2
(45) Date of Patent: Apr. 11, 2017

(54) DYNAMIC PRESENTATION PROTOTYPING AND GENERATION

(71) Applicant: Microsoft Corporation, Redmond, WA (US)

(72) Inventors: Darren K. Edge, Beijing (CN); Koji Yatani, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/933,030

(22) Filed: Jul. 1, 2013

(65) Prior Publication Data

US 2015/0007005 A1    Jan. 1, 2015

(51) Int. Cl.
| | |
|---|---|
| G06F 3/048 | (2013.01) |
| G06F 17/22 | (2006.01) |
| G06F 3/0484 | (2013.01) |
| G06F 17/24 | (2006.01) |

(52) U.S. Cl.
CPC ...... *G06F 3/04847* (2013.01); *G06F 17/2235* (2013.01); *G06F 17/24* (2013.01)

(58) Field of Classification Search
CPC ....... G06F 17/24; G06F 17/211; G06F 17/248
See application file for complete search history.

(56) References Cited

U.S. PATENT DOCUMENTS

| | | | | |
|---|---|---|---|---|
| 5,574,798 A | * | 11/1996 | Greer | G06T 7/60 382/100 |
| 6,084,582 A | * | 7/2000 | Qureshi | H04N 1/32112 715/243 |
| 6,453,302 B1 | | 9/2002 | Johnson et al. | |
| 6,580,438 B1 | | 6/2003 | Ichimura et al. | |
| 6,774,920 B1 | * | 8/2004 | Cragun | G06Q 10/10 715/730 |
| 7,299,418 B2 | | 11/2007 | Dieberger | |
| 7,342,586 B2 | | 3/2008 | Jaeger | |
| 7,428,704 B2 | | 9/2008 | Baker et al. | |

(Continued)

FOREIGN PATENT DOCUMENTS

| | | |
|---|---|---|
| CN | 102081946 | 6/2011 |
| CN | 102169483 A | 8/2011 |

(Continued)

OTHER PUBLICATIONS

Latexcommunity.org: Beamer linking within document, Apr. 2009, pp. 1-5 http://www.latex-community.org/forum/viewtopic.php?f=4&t=4594.*

(Continued)

*Primary Examiner* — Scott Baderman
*Assistant Examiner* — Mario M Velez-Lopez
(74) *Attorney, Agent, or Firm* — Sandy Swain; Micky Minhas; Lee & Hayes PLLC

(57) ABSTRACT

Some implementations may include a computing device to generate a presentation including a plurality of slides. The presentation may be generated based on an input file that includes commands from a presentation markup language. The commands may specify details associated with the presentation. The details may include a title and a background image associated with each of the plurality of slides, one or more points to be included in each of the plurality of slides, and a style associated with the each of the plurality of slides.

20 Claims, 7 Drawing Sheets

(56) References Cited

U.S. PATENT DOCUMENTS

| | | | |
|---|---|---|---|
| 7,549,120 B1 | 6/2009 | Griffith et al. | |
| 7,714,802 B2 | 5/2010 | Hurley et al. | |
| 7,870,503 B1* | 1/2011 | Levy | G06F 9/4443 |
| | | | 707/797 |
| 7,996,436 B2 | 8/2011 | Schneider et al. | |
| 8,166,402 B2 | 4/2012 | Collins et al. | |
| 8,269,790 B2 | 9/2012 | Wong et al. | |
| 9,043,722 B1* | 5/2015 | Holt | G06F 3/04842 |
| | | | 715/781 |
| 9,093,007 B2* | 7/2015 | Berglund | G09G 5/00 |
| 2001/0021938 A1* | 9/2001 | Fein | G06F 17/2715 |
| | | | 715/267 |
| 2002/0194230 A1* | 12/2002 | Polanyi | G06F 17/277 |
| | | | 704/9 |
| 2003/0122863 A1 | 7/2003 | Dieberger et al. | |
| 2003/0202007 A1 | 10/2003 | Silverstein et al. | |
| 2004/0267387 A1* | 12/2004 | Samadani | G11B 27/034 |
| | | | 700/94 |
| 2005/0066059 A1 | 3/2005 | Zybura et al. | |
| 2005/0108619 A1 | 5/2005 | Theall et al. | |
| 2005/0193323 A1* | 9/2005 | Coulomb | G06F 17/241 |
| | | | 715/230 |
| 2005/0246313 A1 | 11/2005 | Turski et al. | |
| 2006/0036568 A1* | 2/2006 | Moore | G06F 17/30126 |
| 2006/0200759 A1 | 9/2006 | Agrawala et al. | |
| 2007/0055926 A1* | 3/2007 | Christiansen | G06F 17/241 |
| | | | 715/210 |
| 2007/0118506 A1* | 5/2007 | Kao | G06F 17/30719 |
| 2007/0171201 A1* | 7/2007 | Pi | G06F 3/021 |
| | | | 345/157 |
| 2008/0034345 A1 | 2/2008 | Curtis et al. | |
| 2009/0044117 A1 | 2/2009 | Vaughan et al. | |
| 2009/0100369 A1 | 4/2009 | Mindrum | |
| 2009/0172548 A1 | 7/2009 | Screen | |
| 2009/0172559 A1* | 7/2009 | Waldman | G06F 17/211 |
| | | | 715/744 |
| 2010/0031152 A1* | 2/2010 | Villaron | G06F 3/0481 |
| | | | 715/731 |
| 2010/0146393 A1 | 6/2010 | Land et al. | |
| 2010/0169784 A1 | 7/2010 | Weber et al. | |
| 2010/0199180 A1* | 8/2010 | Brichter | G06F 3/0482 |
| | | | 715/702 |
| 2010/0218100 A1* | 8/2010 | Simon | G06F 17/30056 |
| | | | 715/731 |
| 2010/0309436 A1* | 12/2010 | Allen, Jr. | G06Q 10/10 |
| | | | 353/21 |
| 2011/0004563 A1* | 1/2011 | Rauber | G06F 17/211 |
| | | | 705/345 |
| 2011/0040804 A1 | 2/2011 | Peirce et al. | |
| 2011/0181602 A1* | 7/2011 | Boda | G06F 9/4443 |
| | | | 345/473 |
| 2011/0191672 A1 | 8/2011 | Schodl et al. | |
| 2011/0271179 A1 | 11/2011 | Jasko et al. | |
| 2011/0295392 A1* | 12/2011 | Cunnington | G06Q 10/10 |
| | | | 700/90 |
| 2011/0302494 A1 | 12/2011 | Callery et al. | |
| 2012/0221975 A1* | 8/2012 | Juristovski | G06F 17/30026 |
| | | | 715/823 |
| 2013/0024772 A1 | 1/2013 | Delia et al. | |
| 2013/0050255 A1 | 2/2013 | Sprang et al. | |
| 2013/0120403 A1 | 5/2013 | Maloney et al. | |
| 2013/0288722 A1* | 10/2013 | Ramanujam | H04W 4/14 |
| | | | 455/466 |
| 2014/0344702 A1 | 11/2014 | Edge et al. | |
| 2015/0033116 A1* | 1/2015 | McKinney | G06F 17/2247 |
| | | | 715/239 |
| 2015/0095785 A1 | 4/2015 | Edge et al. | |
| 2015/0132735 A1 | 5/2015 | Edge et al. | |
| 2015/0178287 A1* | 6/2015 | Kim | G06F 17/30056 |
| | | | 715/202 |

FOREIGN PATENT DOCUMENTS

| | | |
|---|---|---|
| CN | 103279259 | 9/2013 |
| JP | 2004184576 A | 7/2004 |
| WO | WO0026828 A1 | 5/2000 |
| WO | WO2007069557 A1 | 6/2007 |

OTHER PUBLICATIONS

A Beamer Tutorial in Beamer, Apr. 4, 2007, pp. 1-110 https://www.uncg.edu/cmp/reu/presentations/Charles%20Batts%20-%20Beamer%20Tutorial.pdf.*

Indezine.com, Feb. 5, 2012 pp. 1-3 http://www.indezine.com/products/powerpoint/learn/picturesandvisuals/apply-theme-to-photo-album-ppt2010.html.*

Tex, Background image in beamer slides, pp. 1-6 http://tex.stackexchange.com/questions/78464/background-image-in-beamer-slides.*

Tex Sound, embedding sound files, Apr. 12, 2012, pp. 1-3 http://tex.stackexchange.com/questions/51632/embedding-sound-files-into-beamer-presentation-with-media9.*

Slidy—a web based alternative to Microsoft PowerPoint, May 14, 2006, pp. 1-14 http://www.w3.org/2006/05/Slidy-XTech/slidy-xtech06-dsr.pdf.*

Office action for U.S. Appl. No. 13/898,338 mailed on Aug. 19, 2015, Edge et al., "Adaptive Timing Support for Presentations", 17 pages.

Wikipedia: "Digital Dictation", Internet Article, Mar. 22, 2013, retrieved on Jul. 29, 2015 at <<https://en.wikipedia.org/w/index.php?title=Digital_dictation&oldid=546255522>>, Wikipedia, 3 pgs.

The PCT Written Opinion of the IPEA mailed Aug. 4, 2015 for PCT application No. PCT/US2014/064714, 9 pages.

U.S. Appl. No. 14/077,674, Darren Edge et al., "Presentation Rehearsal," filed Nov. 12, 2013, 52 pages.

Lichtschlag, "Fly an Organic Authoring Tool for Presentations," published Nov. 10, 2008, In proceedings: In Diploma Thesis at the Media Computing Group, retrieved at <<http://hci.rwth-aachen.de/materials/publications/lichtschlag2008.pdf>>, 114 pages. (in 2 parts).

The PCT Search Report and Written Opinion mailed Jul. 1, 2014 for PCT application No. PCT/CN2013/084565, 11 pages.

PCT Patent Application PCT/CN2013/078288 filed on Jun. 28, 2013, Koji Yatani et al., "Selecting and Editing Visual Elements with Attribute Groups," 44pages.

"Tutorial: An Introduction to the Magic Move Transition in Keynote," retrieved on Aug. 30, 2013 at >>http://www.keynoteclassroom.com/index_files/Tutorial-Magic-Move.html>>, 2 pages.

Tweening in PowerPoint, published on Feb. 2, 2010, retrieved at >>http://www.pptalchemy.co.uk/Tweeny.html>>, 2 pages.

Supplementary European Search Report mailed on Oct. 28, 2015, for European patent application No. 13876698.5 (2 pages).

Raggett, et al., "HTML 4.01 Specification", Internet Citation, Dec. 24, 1999, retrieved from the Internet on May 3, 2011 at URL:http://www.w3.org/TR/html401 (218) pages.

Edge et al., "HyperSlides: Dynamic Presentation Prototyping," In ACM SIGCHI Conference on Human Factors in Computing Systems, Apr. 29, 2013, 10 pages.

Gouli et al., "An Adaptive Feedback Framework to Support Reflection, Guiding and Tutoring," Advances in Web-Based Education: Personalized Learning Environments, Oct. 2005, 19 pages.

Mamykina et al., "Time Aura Interfaces for Pacing," CHI 2001 Conference on Human Factors in Computing Systems, Mar.-Apr. 2001, vol. 3, Issue 1, pp. 144-151.

U.S. Appl. No. 13/898,338, Edge et al., Adaptive Timing Support for Presentations, filed May 20, 2013, 55 pages.

PCT Application No. PCT/CN2013/072061, Yatani, et al., Dynamic Presentation Prototyping, filed Mar. 1, 2013, 55 pages.

Pavivio, "Mental Representations: A Dual Coding Approach," Oxford University Press, 1990, 170 pages (2 parts).

(56) References Cited

OTHER PUBLICATIONS

Reynolds, "Presentation Zen: Simple Ideas on Presentation Design and Delivery," New Riders, 2008, 234 pages.

Stiller et al., "Presentation time concerning system-paced multimedia," Australian Journal of Educational Technology, vol. 27, Issue 4, Aug. 2011, pp. 693-708.

Tam, "The Design and Field Observation of a Haptic Notification System for Timing Awareness During Oral Presentations," In Phd Thesis Submitted in Partial Fulfillment of the Requirements for the Degree of Master of Science, The University of British Columbia, Vancouver, BC, Canada, Oct. 2012, 120 pages.

Tufte, "The Cognitive Style of PowerPoint: Pitchng Out Corrupts Within," 2003, Graphics Press, 28 pages.

Weissman, "Presenting to Win: The Art of Telling Your Story," FT Press, 2009, 268 pages.

Weissman, "The Power Presenter: Technique, Style, and Strategy from America's Top Speaking Coach," Wiley, 2009, 135 pages.

"Apple Keynote," retrieved on Feb. 12, 2013 at <<http://www.apple.com/iwork/keynote/>>, Apple Inc., 2013, 4 pages.

Beck et al., "Principles behind the Agile Manifesto," retrieved on Feb. 12, 2013 at <<http://agilemanifesto.org/principles.html>>, 2001, 2 pages.

Bederson et al., "Pad++: Advances in Multiscale Interfaces," retrieved on Feb. 9, 2013 at <<http://wiki.lri.fr/fondihm/_files/pad-chi94-bederson.pdf>>, ACM, Proceedings of Conference Companion on Human Factors in Computing Systems, Apr. 24, 1994, p. 315-316.

Bohon, "How to Create a Presentation with Markdown," retrieved on Mar. 5, 2013 at <<http://www.maclife.com/article/howtos/how_create_presentation_markdown>>, Mac/Life, May 2, 2012, 5 pages.

Carnegie, "The Quick and Easy Way to Effective Speaking: Modern Techniques for Dynamic Communication," Pocket Books, copyright 1962, 112 pages.

Carpenter et al., "What types of learning are enhanced by a cued recall test?" retrieved on Feb. 9, 2012 at <<http://www.edvul.com/pdf/CarpenterPashlerVul-PBR-2006.pdf>>, Psychonomic Bulletin and Review, vol. 13, No. 5, 2006, pp. 826-830.

Charmaz, "Constructing Grounded Theory: A Practical Guide through Qualitative Analysis. Sage," Sage Publications, 2006, 219 pages.

"Create a PowerPoint presentation from a plain text file," retrieved on Mar. 5, 2013 at <<http://www.ppffaq.com/FAQ00246_Create_a_PowerPoint_presentation_from_a_plain_text_file.htm>>, PPTools, retrieved Mar. 5, 2013, 2 pages.

Duarte, "Resonate: Present Visual Stories that Transform Audiences," Wiley, 2010, 251 pages.

Duarte, "Slide:ology: The Art and Science of Creating Great Presentations," O'Reilly Media, 2010, 240 pages.

Edge et al., "MicroMandarin: Mobile Language Learning in Context," retrieved on Feb. 9, 2013 at <<http://voxy.com/blog/wp-content/uploads/2011/03/micromandarin.pdf>>, Proceedings of Conference on Human Factors in Computing Systems (CHI), May 7, 2011, pp. 3169-3178.

Fourney et al., "Gesturing in the Wild: Understanding the Effects and Implications of Gesture-Based Interaction for Dynamic Presentations," retrieved on Feb. 9, 2013 at <<http://www.adamfourney.com/papers/fourney_terry_mann_bhci2010.pdf>>, Proceedings of British Computer Society (BCS) Interaction Specialist Group Conference, Sep. 6, 2010, pp. 230-240.

Gallo, "The Presentation Secrets of Steve Jobs: How to be Insanely Great in Front of Any Audience," McGraw Hill, 2010, 128 pages.

Good et al., "Zoomable user interfaces as a medium for slide show presentations," retrieved on Feb. 9, 2013 at <<http://citeseerx.ist.psu.edu/viewdoc/download?doi=10.1.1.101.2931&rep=rep1&type=pdf>>, Journal of Information Visualization, vol. 1, No. 1, Mar. 2002, pp. 35-49.

"Google Docs Presentations," retrieved on Feb. 13, 2013 at <<http://www.google.com/drive/start/apps.html#product=slides>>, Google Drive, 3 pages.

"Haiku Deck," retrieved on Feb. 13, 2013 at <<http://www.haikudeck.com/>>, Giant Thinkwell Inc., 2012, 2 pages.

"Impress.js," retrieved on Feb. 13, 2013 at <<http://bartaz.github.com/impress.js/#/title>>, 4 pages.

Iqbal et al., "Peripheral Computing During Presentations: Perspectives on Costs and Preferences," retrieved on Feb. 9, 2013 at <<http://citeseerx.ist.psu.edu/viewdoc/download?doi=10.1.1.188.4197&rep=rep1&type=pdf>>, Proceedings of Conference on Human Factors in Computing Systems (CHI), May 7, 2011, pp. 891-894.

Kurihara et al., "Presentation Sensei: A Presentation Training System using Speech and Image Processing," retrieved on Feb. 9, 2013 at <<http://www.unryu.org/home/papers/icmi130-kurihara.pdf>>, Proceedings of Intl Conference on Multimodal Interfaces (ICMI), Nov. 12, 2007, pp. 358-365.

Lane et al., "Cafe-style PowerPoint: Navigation's Conversational Touch," retrieved on Mar. 5, 2013 at <<http://office.microsoft.com/en-in/powerpoint-help/cafe-style-powerpoint-navigation-s-conversational-touch-HA010274710.aspx>>, Microsoft Corporation, 2013, 5 pages.

Lanir et al., "Observing Presenters' Use of Visual Aids to Inform the Design of Classroom Presentation Software," retrieved on Feb. 9, 2013 at <<http://nguyendangbinh.org/Proceedings/CHI/2008/docs/p695.pdf>>, Proceedings of Conference on Human Factors in Computing Systems (CHI), Apr. 5, 2008, pp. 695-704

Levasseur et al., "Pedagogy Meets PowerPoint: A Research Review of the Effects of Computer-Generated Slides in the Classroom," retrieved on Feb. 9, 2013 at <<http://flc-ppt-plus.wikispaces.com/file/view/LevasseurandSawyer.pdf>>, National Communication Association, The Review of Communication, vol. 6, No. 1-2, Jan.-Apr. 2006, pp. 101-123.

Lichtschlag et al., "Canvas Presentations in the Wild," CHI 12 EA, 2012, pp. 537-540.

Lichtschlag et al., "Fly: Studying Recall, Macrostructure Understanding, and User Experience of Canvas Presentation," Session: Space: The Interaction Frontier, CHI 2012, May 5-10, 2012, Austin, Texas, USA, 4 pages.

Lichtschlag et al., "Fly: A Tool to Author Planar Presentations," retrieved on Feb. 9, 2013 at <<https://hci.rwth-aachen.de/materials/publications/lichtschlag2009.pdf>>, Proceedings of Conference on Human Factors in Computing Systems (CHI), Apr. 4, 2009, pp. 547-556.

Mayer, "Multi-Media Learning," New York: Cambridge University Press, 2009, 2nd edition, 162 pages.

Mayer, "Multimedia Learning: Are We Asking the Right Questions?" retrieved Feb. 9, 2013 at <<http://www.uky.edu/gmswan3/544/mayer_1997.pdf>>, Journal of Educational Psychologist, vol. 32, No. 1, 1997, pp. 1-19.

Mayer, et al., "Nine Ways to Reduce Cognitive Load in Multimedia Learning," retrieved on Feb. 9, 2013 at <<http://www.uky.edu/~mswan3/544/9_ways_to_reduce_CL.pdf>>, Journal of Educational Psychologist, vol. 38, No. 1, 2003, pp. 43-52.

"Microsoft Powerpoint," retrieved on Feb. 13, 2013 at http://office.microsoft.com/en-us/powerpoint>>, Microsoft Corporation, 2013, 2 pages.

Moscovich et al., "Customizable Presentations," retrieved on Feb. 9, 2013 at <<http://www.moscovich.net/tomer/papers/cpresentations.pdf>>, Proceedings of Intl Conference on Multimodal Interfaces (ICMI), Nov. 5, 2003, 5 pages.

Nelson et al., "Palette: A Paper Interface for Giving Presentations," retrieved on Feb. 9, 2013 at <<http://citeseerx.ist.psu.edu/viewdoc/download?doi=10.1.1.39.5686&rep=rep1&type=pdf>>, Proceedings of Conference on Human Factors in Computing Systems (CHI), May 1999, pp. 354-361.

Nelson et al., "Pictorial Superiority Effect. Journal of Experimental Psychology: Human Learning & Memory," Sep. 1976, vol. 2, pp. 523-528.

Norman, "In Defense of PowerPoint," retrieved on Feb. 13, 2013 at <<http://www.jnd.org/dn.mss/in_defense_of_p.html>>, 2004, 5 pages.

Panjwani, et al., "Collage: A Presentation Tool for School Teachers," retrieved on Feb. 9, 2013 at <<http://www.gg.rhul.ac.uk/ict4d/ictd2010/papers/ICTD2010%20Panjwani%20et%20al.pdf>>, Pro-

(56) References Cited

OTHER PUBLICATIONS ceedings of ACM/IEEE Intl Conference on Information and Communication Technologies and Development (ICTD), Article No. 30, Dec. 13, 2010, 10 pages.
Parker, "Absolute PowerPoint: Can a Software Package Edit our Thoughts?" retrieved on Feb. 9, 2013 at <<http://www.utdallas.edu/~dxt023000/courses/6331/readings/Anti-PowerPoint.pdf>>, The New Yorker, May 28, 2001, 15 pages.
"Pecha Kucha 20×20," retrieved Feb. 13, 2013 at <<http://www.pechakucha.org/>>, 2013, 5 pages.
"PPTPlex PowerPoint Add-In," retrieved on Feb. 13, 2013 at <<http://www.microsoft.com/en-us/download/details.aspx?id=28558>>, Microsoft Corporation, Dec. 15, 2011, 2 pages.
"Prezi—Ideas matter," retrieved on Feb. 13, 2013 at <<http://prezi.com/>>, Prezi Inc., 2013, 3 pages.
Raggett, "HTML Slidy: Slide Shows in HTML and XHTML," retrieved on Feb. 13, 2013 at <<http://www.w3.org/Talks/Tools/Slidy2/#(1)>>, W3C, 2013, 23 pages.
Roberts, "Aristotle's Rhetoric," retrieved on Feb. 12, 2013 at <<http://rhetoric.eserver.org/aristotle/>>, Alpine Lakes Design, A hypertextual resource compiled by Lee Honeycutt, 2011, 1 page.
Signer, et al., "PaperPoint: A Paper-Based Presentation and Interactive Paper Prototyping Tool," retrieved on Feb. 9, 2013 at <<http://citeseerxist.psu.edu/viewdoc/download?doi=10.1.1.71.6985&rep=rep1&type=pdf>>, Proceedings of Intl Conference on Tangible and Embedded Interaction (TEI), Feb. 15, 2007, p. 57-64.
"SlideShare," retrieved on Feb. 13, 2013 at <<http://www.slideshare.net/>>, SlideShare Inc., 2013, 9 pages.
Spicer, et al., "NextSlidePlease: Authoring and Delivering Agile Multimedia Presentations," retrieved on Feb. 9, 2013 at <<http://ame2.asu.edu/faculty/hs/pubs/2012/2012_nsp.pdf>>, Journal of ACM Transactions on Multimedia Computing, Communications, and Applications (TOMCCAP), vol. 2, No. 3, May 2010, 25 pages.
Sweller, "Cognitive Load During Problem Solving: Effects on Learning," retrieved on Feb. 9, 2013 at <<http://csjarchive.cogsci.rpi.edu/1988v12/i02/p0257p0285/main.pdf>>, Journal of Cognitive Science, vol. 12, No. 2, Apr. 1988, pp. 257-285.
Teevan et al., "Displaying Mobile Feedback during a Presentation," retrieved on Feb. 9, 2013 at <<http://research.microsoft.com/en-us/um/people/teevan/publications/papers/mobilehci12.pdf>>, Proceedings of Intl Conference on Human-Computer Interaction with Mobile Devices and Services (MobileHCI), Sep. 21, 2012, 4 pages.
The Beamer Package, retrieved on Feb. 12, 2013 at <<http://en.wikibooks.org/wiki/LaTeX/Presentations>>, Wikimedia, 2011, 12 pages.
"Welcome to the Open XML SDK 2.5 CTP for Office," retrieved on Feb. 9, 2013 at <<http://msdn.microsoft.com/en-us/library/office/bb448854.aspx>>, Microsoft Corporation, Aug. 22, 2012, 2 pages.
Wozniak et al., "Optimization of Repetition Spacing in the Practice of Learning," retrieved on Feb. 9, 2013 at <<http://www.ane.pl/pdf/5409.pdf>>, Journal of Acta Neurobiologiae Experimentalis, vol. 54, No. 1, 1994, pp. 59-62.
Yonge, translation of Cicero's De Inventione, "Treatise on Rhetorical Invention," retrieved on Feb. 12, 2013 at <<http://www.classicpersuasion.org/pw/cicero/dnvindex.htm>>, The Orations of Marcus Tullius Cicero: Cicero's De Inventione translated by C. D. Yonge, George Bell and Sons, London, vol. 4, 1888, pp. 241-380.
Zongker, "Creating Animation for Presentations," retrieved on Feb. 9, 2013 at <<http://grail.cs.washington.edu/theses/ZongkerPhd.pdf>>, PhD Dissertation, University of Washington, 2003, 228 pages.
U.S. Appl. No. 13/898,338, Darren Edge et al., "Adaptive Timing Support for Presentations," filed May 20, 2013, 55 pages.
International Search Report & Written Opinion for PCT Patent Application No. PCT/CN2013/072061, Mailed Date: Dec. 5, 2013, Filed Date: Mar. 1, 2013, 10 pages.
"International Search Report & Written Opinion for PCT Patent Application No. PCT/US2014/064714", Mailed Date: Mar. 24, 2015, 10 Pages.
Wikipedia: "Laptop", retrieved on Mar. 16, 2015 at <<http://en.wikipedia.org/w/index.php?title=Laptop&oldid=580975732>>, Wikipedia, 23 pgs.
Wikipedia: "Microsoft PowerPoint", retrieved on Mar. 13, 2015 at <<http://en.wikipedia.ore/w/index.php?title=Microsoft_PowerPoint&oldid+580301821>>, Wikipedia, 10 pgs.
Office action for U.S. Appl. No. 13/898,338, mailed on Apr. 8, 2015, Edge et al., "Adaptive Timing Support for Presentations", 15 pages.
"International Search Report and Written Opinion Issued in PCT Patent Application No. PCT/US2014/038530", Mailed Date: Jan. 22, 2015, 11 Pages.
Wikipedia: "Presentation program", retrieved on Mar. 13, 2015 at <<http://en.wikipedia.org/w/index.php?title=Presentation_program&oldid=580933046>>, Wikipedia, 3 pgs.
European Office Action mailed Dec. 18, 2015 for European patent application No. 13876698.5, a counterpart foreign application of U.S. Appl. No. 13/933,030, 6 pages.
Office action for U.S. Appl. No. 13/898,338, mailed on Dec. 15, 2015, Edge, et al., "Adaptive Timing Support for Presentations", 16 pages.
"PowerPoint2010: Applying Transitions", Retrieved from <<http://www.gcflearnfree.org/powerpoint2010/6.4>>, Available as early as Jan. 2011, 1 page.
Career Track, "QuickClicks Reference Guide to Microsoft PowerPoint 2010", Published by Career Track, a Division of Park University Enterprises, Inc., 2011, 4 pages.
Office action for U.S. Appl. No. 14/077,674, mailed on Feb. 1, 2016, Edge et al., "Presentation Rehearsal", 33 pages.
European Office Action mailed Apr. 4, 2016 for European patent application No. 14730712.8, a counterpart foreign application of U.S. Appl. No. 13/898,338, 5 pages.
Office action for U.S. Appl. No. 13/898,338, mailed on Apr. 15, 2016, Edge et al., "Adaptive Timing Support or Presentations", 17 pages.
European Search Report mailed Mar. 15, 2016 for European patent application No. 14730712.8, 4 pages.
PCT International Preliminary Report on Patentability for Application No. PCT/US2014/064714, mailed on Feb. 15, 2016 (8 pages).

\* cited by examiner

DYNAMIC PRESENTATION PROTOTYPING AND GENERATION

RELATED APPLICATION

This application is a national stage application of an international patent application PCT/CN2013/072061, filed Mar. 1, 2013, entitled "DYNAMIC PRESENTATION PROTOTYPING AND GENERATION," which application is hereby incorporated by reference in its entirety.

BACKGROUND

Current software applications that enable the creation of presentations may structure workflow in such a way that users spend too much time on style rather than the substance of the messages to be communicated. For example, users may simply dump content onto slides rather than applying basic principles of visual design and storytelling. In addition, users may create a linear slide show that does not take into account in-depth information about related topics that may arise during the delivery of the presentation.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations may include a computing device to generate a presentation including a plurality of slides. The presentation may be generated based on an input file that includes commands from a presentation markup language. The commands may specify details associated with the presentation. The details may include a title and a background image associated with each of the plurality of slides, one or more points to be included in each of the plurality of slides, and a style associated with the each of the plurality of slides.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

The systems and techniques described herein may be used to create presentations that are dynamic compared to traditional linear presentations. For example, the presentations may include presentations that are dynamically alterable during rehearsal and delivery. A user may specify and manipulate the points to be made in the presentation and the relationships between the points. The user may select global style parameters (e.g., fonts, colors, spacing, and the like) independently or using suggested themes. The presentation media (e.g., slide decks and/or other types of media) may be generated automatically based on the specified points, relationships, and styles. The user may repeatedly review the presentation, tweak the presentation (e.g., by tweaking one or more of the points, relationships, or global style parameters), and re-generate the presentation media until the user is satisfied. The resulting presentation may support interaction with points in the presentation medium based on the relationships between the points to enable self-testing during rehearsal and flexible navigation during delivery.

Presentations specified in such a manner may be edited and regenerated quickly using a rapid prototyping process, thereby providing a usable presentation quickly while supporting changes in presentation style and structure as the presentation evolves. The presentation media may be automatically generated to include rich navigation options reflecting the relationships between points, in ways that would be laborious to set up by hand and fragile (e.g., manually hyperlinking slides) in response to structural changes. The systems and techniques described herein may be deployed equally effectively on a variety of platforms, from desktop computers, to laptop computers, to touch-based tablet devices, enabling authoring capabilities that are idea-based rather than style-based, that support casual entry that is not labor intensive, and where touchscreen capabilities may be supported to enable dynamic navigation rather than linear presentation.

Illustrative Architectures

Figure 1:
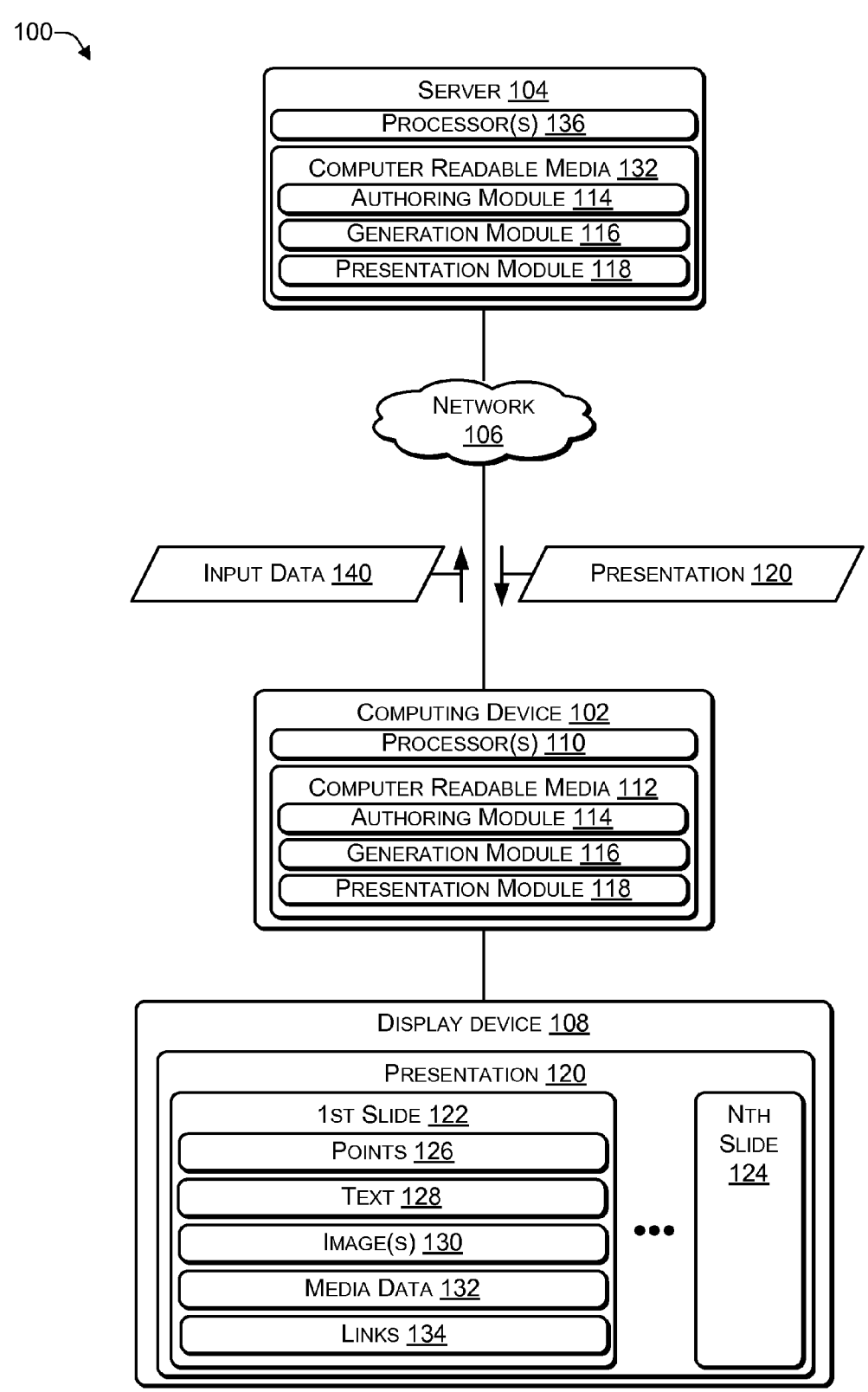
FIG. 1 is an illustrative architecture that includes creating a presentation according to some implementations.

FIG. 1 is an illustrative architecture 100 that includes creating a presentation according to some implementations. The architecture 100 includes a computing device 102 coupled to a network 106. The network 106 may include one or more networks, such as a wireless local area network (e.g., WiFi®, Bluetooth™, or other type of near-field communication (NFC) network), a wireless wide area network (e.g., a code division multiple access (CDMA), a global system for mobile (GSM) network, or a long term evolution (LTE) network), a wired network (e.g., Ethernet, data over cable service interface specification (DOCSIS), Fiber Optic System (FiOS), Digital Subscriber Line (DSL) and the like), other type of network, or any combination thereof.

The computing device 102 may be coupled to the display device 108, such as a monitor. In some implementations, the display device 108 may include a touchscreen. The computing device 102 may be a desktop computing device, a laptop computing device, a tablet computing device, a wireless phone, a media playback device, a media recorder, another type of computing device, or any combination thereof. The computing device 102 may include one or more processors 110 and one or more computer readable media 112. The computer readable media 112 may include instructions that are organized into modules and that are executable by the one or more processors 110 to perform various functions. For example, the computer readable media 112 may include an authoring module 114, a generation module 116, and a presentation module 118. The authoring module 114 may enable a user of the computing device 102 to author a presentation 120 by specifying points to be made, the relationships between the points, and styles associated with the points. The generation module 116 may enable the user to generate the presentation 120 after authoring the presentation 120. The presentation module 118 may enable the user to present the presentation 120 using a display device, such as the display device 108. If the user does not specify a style for the presentation 120, one or more of the modules 114, 116, or 118 may select a default style.

The presentation 120 may include one or more slides, such as a first slide 122 to an Nth slide 124 (where N>1). Each of the N slides may include one or more points 126, text 128, one or more images 130, media data 132, links 134, or any combination thereof. Of course, other types of data may also be included in the presentation 120. The points 126 may include one or more primary concepts or ideas that are to be conveyed to the audience. The points 126 may be conveyed using one or more of the text 128, the images 130, or the media data 132. The text 128 may include text that specifies details associated with one or more of the points 126. The one or more images 130 may include images (e.g., photographs, graphics, icons, or the like) that visually illustrate one or more of the points 126. The media data 132 may include audio data, video data, or other types of media data that may be played back to illustrate one or more of the points 126. The links 134 may be specified by a user and may be used to connect different points (e.g., from the points 126) and different slides (e.g., from the N slides 122 to 124) with each other to enable a presenter to dynamically provide additional details associated with a particular point during the presentation. For example, based on the type of audience to which the presentation is being given, different questions may arise relating to the same point. The links 134 may enable the presenter to branch off and present additional information to answer different questions arising from the same point. For example, a point may have three sub-points, A1, A2, and A3. If a question arises relating to sub-point A1, the presenter may select a first link to present additional materials associated with the sub-point A1. Similarly, if a question arises relating to sub-point A2, the presenter may select a second link to present additional materials associated with the sub-point A2. If a question arises relating to sub-point A3, the presenter may select a third link to present additional materials associated with the sub-point A3. If no questions arise relating to sub-points A1, A2, or A3, then the presenter may move to a next point without accessing the additional materials related to sub-points A1, A2, and A3. Thus, the links 134 may enable the presenter to dynamically customize the delivery of the presentation 120 while presenting the presentation 120.

The server 104 may include one or more processors 136 and one or more computer readable media 138. The computer readable media 138 may include one or more of the authoring module 114, the generation module 116, or the presentation module 118. In some cases, one or more of the modules 114, 116 or 118 may be downloaded from the server 104 and stored in the computer readable media 112 to enable a user of the computing device 102 to use the modules 114, 116 or 118. In other cases (e.g., in a cloud computing environment), the server 104 may host one or more of the modules 114, 116 or 118 and the computing device 102 may access one or more of the modules 114, 116 or 118 using the network 106. For example, the computing device 102 may send input data 140 to the server 104. The input data 140 may include authoring information, such as points to be made in a presentation, the relationship between the points, and specified styles. The server 104 may generate the presentation 120 based on the input data 140 and send the presentation 120 to the computing device 102. The modules 114, 116, or 118 may be distributed across multiple computing devices, such as the computing device 102 and the server 104.

Thus, the computing device 102 may enable a user to author a presentation 120. In some cases, the presentation may be generated by the computing device 102 using the generation module 116 stored in the computer readable media 112. In other cases, the server 104 may generate the presentation 120 using the generation module 116 stored in the computer readable media 138 based on the input data 140 provided by the computing device 102. The presentation 120 may be presented on the display device 108 using the computing device 102 (or another computing device). For example, the presentation 120 may be authored and generated using the computing device 102 and/or server 104 but may be presented using a different computing device.

The computer readable media 112, 132 are examples of storage media used to store instructions which are executed by the processor(s) 110, 130 to perform the various functions described above. For example, the computer readable media 112, 132 may generally include both volatile memory and non-volatile memory (e.g., RAM, ROM, or the like). Further, the computer readable media 112, 132 may include hard disk drives, solid-state drives, removable media, including external and removable drives, memory cards, flash memory, floppy disks, optical disks (e.g., CD, DVD), a storage array, a network attached storage, a storage area network, or the like. The computer readable media 112, 132 may be one or more types of storage media capable of storing computer-readable, processor-executable program instructions as computer program code that can be executed by the processor(s) 110, 132 as a particular machine configured for carrying out the operations and functions described in the implementations herein.

The computing device 102 and server 104 may also include one or more communication interfaces for exchanging data with other devices, such as via a network, direct connection, or the like, as discussed above. The communication interfaces may facilitate communications within a wide variety of networks and protocol types, including wired networks (e.g., LAN, cable, etc.) and wireless networks (e.g., WLAN, cellular, satellite, etc.), the Internet and the like. The communication interfaces may also provide communication with external storage (not shown), such as in a storage array, network attached storage, storage area network, or the like.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Furthermore, while FIG. 1 sets forth an example of a suitable architecture to generate presentations, numerous other possible architectures, frameworks, systems and environments will be apparent to those of skill in the art in view of the disclosure herein.

Figure 2:
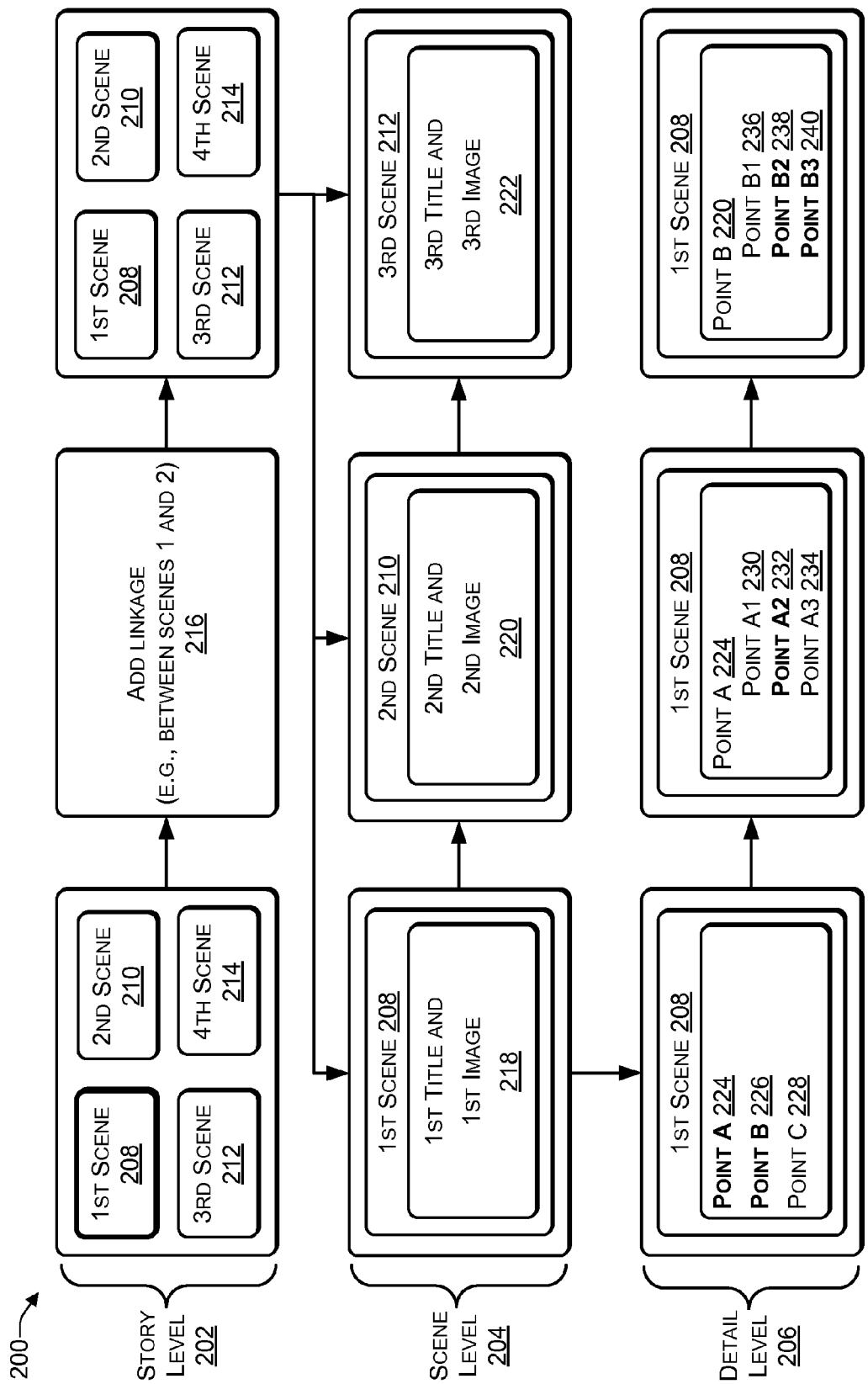
FIG. 2 is an illustrative architecture that includes creating a presentation at a story level, a scene level, and a detail level according to some implementations.

FIG. 2 is an illustrative architecture 200 that includes creating a presentation at a story level, a scene level, and a detail level according to some implementations. The architecture 200 illustrates how a user may author the presentation 120 using the authoring module 114. To enable the user the author the presentation 120, the authoring module 114 may provide a graphical user interface, a command line interface, markup commands, other types of authoring commands, or any combination thereof.

Setting Goals Given Constraints

A presentation, such as the presentation 120, may be created with a goal that is constrained by parameters, such as the content, the audience, the schedule, the event, the preparation context, and the delivery context. For example, a presenter may desire that the look of the presentation not overshadow the actual content and/or message of the presentation. Presentations may be explicitly constrained by rules, such as an amount of time, a number of slides, or other constraint that is allocated to the presenter. When creating a presentation, presenters may be influenced by the relative performance of peers when the peers deliver similar presentations. Presenters may take into consideration the relationship between different kinds of audience members and the content to be presented, anticipating and formulating responses to questions that could arise as a result.

Telling Stories with a Presentation

A presentation may include information and examples that are wrapped in a narrative and delivered through the interplay of visuals and speech. The presentation may have multiple points and layers that are connected by a sense of coherence and flow. The modules, 114, 116, or 118 may enable a story to be developed before the presentation 120 is generated. Starting with the goal in mind may guide subsequent activities, including crafting implicit messages, explicit takeaways, or rhetorical questions. For example, mapping points to slide titles may provide a provisional structure for elaboration. The modules, 114, 116, or 118 may enable the user to quickly and easily replace text with images and/or graphics that convey the intended message.

The modules, 114, 116, or 118 may enable connecting a slide to a next slide by using a leading question, a hint, or a concern prior to moving from the slide to the next slide. Planning and adding transition words to a presentation may enable the presenter to explain to the audience why the presentation is moving to the next topic. The modules, 114, 116, or 118 may enable the presenter to view and rearrange content at a high-level to enable the presenter to create a sense of flow using images and/or descriptive text. For example, each part of the presentation may be tied to a main theme/story that the presentation is conveying.

Preparing for Structured Spontaneity

The modules, 114, 116, or 118 may enable a presenter to rehearse and refine a presentation to preserve the presentation structure in the mind of the presenter, thereby encouraging a natural delivery that is free from reading and recital. For example, the authorizing module 114 may provide a rehearsal mode that enables the use of visual cues in slides for the recall of points that are to be made verbally. To illustrate, the rehearsal mode may enable the presenter to learn the association between the visual cues and the points to be made using presenter notes, by providing physical or electronic flashcards to drill points into memory, or other types of cues. During rehearsal, practicing speaking slides out loud may highlight differences between written and spoken language and support the rephrasing of the language in the presenter notes. The rehearsal mode may enable the presenter to establish a mental structure using performance-oriented rehearsals, such as practice walking around, in front of a mirror, gesturing, or visualizing the delivery.

Orchestrating Focus and Flow

During delivery, the presenter may desire to communicate a presentation that flows smoothly from start to finish by directing the audience's attention to key points using a combination of visuals, gestures, and speech. Breaking the flow of the presentation may be detrimental to the presenter and/or the audience by side-tracking the presentation from the key points of the presentation. For example, after creating the presentation but before presenting the presentation, the presenter may obtain information (e.g., a recent event that occurred) and alter the emphasis of the presentation based on the information. For example, the presenter may determine to go into more detail on some points while glossing over or skipping other points. Thus, a presenter may desire to present portions of the presentation in a non-linear order based on information obtained prior to presenting the presentation, in response to audience questions, etc. Memorizing where various pieces of information are presented in the presentation may be impractical for large presentations and/or presentations that have undergone significant revisions. Exiting a presentation to access additional files may result in losing the attention of audience members and/or creating a perception that the presenter is disorganized. Even if a presenter prepares extra slides (e.g., as an appendix at the end of the presentation) to enable the presenter discuss points in greater detail, accessing the appropriate slides and then resuming the presentation may be disruptive to the flow of the presentation.

To enable a presentation to be presented smoothly in a non-linear manner, the authorizing module 114 may enable linking various portions of the presentation. For example, a presenter may link points with other points (e.g., sub-points), slides with other slides, etc. to enable non-linear delivery of the presentation without disrupting the flow of the presentation. Such a presentation may enable the presenter to dynamically customize the presentation while the presenter is presenting the presentation. The presenter can respond to information obtained after the presentation was generated by presenting the presentation in a way that focuses on the points that are relevant to the information while skimming or ignoring irrelevant points. The presenter can respond to questions and explore details about points that are of interest to audience members while skimming or ignoring points that are of less interest to the audience.

Influencing the Audience with Timing

Communication takes place over time, and the presenter's timed rehearsals, attention to timekeeping, and rhythm of spoken delivery may affect audience perceptions. For example, even with good timekeeping, the number of questions asked or the amount of discussion generated by certain points may cause the presenter to skip portions of the presentation to remain within the allotted time constraints. As another example, a stressed presenter may speak too fast or go through the presentation so quickly that audience members are unable to absorb the contents of the presentation, leaving the audience frustrated. During delivery, presenters may desire to hit particular topics by particular times. To end the presentation gracefully, some presenters may use a timer that signals the presenter at a predetermined interval (e.g., 2 minutes, 5 minutes, etc.) before the end of the time allotted for the presentation. Finishing on time is often viewed as a measure of success for a presentation, particularly when the alternative is being told to stop speaking.

Thus, presenters who do not rehearse may overestimate or underestimate the number of points that may be covered in a particular time period and end up either skipping through large portions of the presentation or zipping through the presentation. In either case, the audience may be frustrated because the presentation was not presented in a manner that was conducive to the audience learning the intended message. The modules, 114, 116, or 118 may enable the presenter to rehearse and time presenting the presentation in a way that the audience leaves having understood the intended message. For example, the presenter may set time targets for high level scenes and one or more of the modules 114, 116, or 118 may proportionately distribute the time target to subordinate (e.g., detail) slides and/or points. Thus, when timing feedback is displayed for a scene slide (e.g., during rehearsal or delivery), and the presenter navigates to a subordinate detail slide, the same timing feedback may seamlessly continue until the presenter moves to a different scene. Such a per-scene approach might require less presenter effort and pressure as compared to a per-slide approach.

As discussed above, audience interaction and time constraints may shape the authoring, rehearsal, and delivery of a presentation. However, the authoring environment of conventional presentation applications may constrain presenters to a primarily linear presentation delivery. In contrast, the modules, 114, 116, or 118 enable a user to specify constraints (e.g., time constraints) while enabling dynamic presentation rehearsal and delivery. Given a fixed amount of time to prepare a presentation, the time saved by not directly manipulating text, images, and other slide parameters to achieve a particular style may be reallocated to more important activities, such as (a) telling stories using the presentation by thinking about the sequence, structure, and purpose of the points to be made and (b) preparing for structured spontaneity. Time spent on these activities may result in the presenter having a more rehearsed mastery of in-depth material, thereby creating the freedom for the presenter to be more dynamic, responsive, and improvisational during delivery.

The presentation modules 114, 116, or 118 may enable presenters to organize the points they wish to communicate and automatically generate a presentation based on the organization of the points. Enabling presenters to plan the presentation using points before committing them to a presentation (e.g., slides) may enable the presenter to visualize the entire story to be unfolded using the presentation. Enabling presenters to plan the presentation using points may enable presenters to focus on crafting a story that is effective, memorable, and appropriate for the audience. The modules 114, 116, or 118 may enable presenters to take a collection of points sourced from multiple documents and/or multiple people and generate a presentation that includes those points along with a consistent style. The style used for the presentation may be quickly and easily customizable while conforming to best practices in the visual design of presentations. Styling a presentation may enable the use of images to emotionally impact the audience. Concepts presented using images may be remembered by the audience for a longer period of time than concepts presented by words alone. In general, the styling may enable principles of visual design, including contrast, repetition, alignment, and proximity.

The modules 114, 116, or 118 may enable presenters to craft and connect the central scenes of a high-level narrative and encourage planning of verbal linkages between scenes to strike a balance between storytelling and analysis. The points may be organized into scenes based on the presenter determining how deeply to explore each scene while completing the presentation on time. The term "scene" as used herein refers to a set of one or more points that advance a higher-level story. Scenes may enable the presentation to flow from a portion of the presentation (e.g., a slide) to a next portion (e.g., a next slide), using a chronological flow, a problem/solution flow, or an opportunity/leverage flow. Appropriate scenes for a presentation may be discovered by clustering related points into different organizational structures, such as columns or a hierarchical tree. A hierarchical organization of the scenes and/or the points within each scene may enable the organization of the presentation such that supporting information branches off from the primary idea(s) being conveyed.

The modules 114, 116, or 118 may enable presenters to link scenes in various ways, such as using an opening gambit (e.g., a question, a factoid, or an anecdote), making repeated references to the flow structure, making logical transitions between outbound and inbound topics, closing with a call to action, etc. Presenting a visual road map (e.g., outline) near the start and end of the presentation may guide the audience when the presentation is being presented and may assist the audience with retaining a mental model of the presentation. Linking points to other points and scenes may enable the dynamic expansion of points into sub-points, notes, media, files, or web pages that support the point being presented. Cued-recall learning refers to a flashcard-like method of testing recall of target information given an initial cue. Unlike conventional presentation software, the modules 114, 116, or 118 may support cued-recall learning. During delivery, the ability to expand points as needed (e.g., on-demand) gives the presenter the freedom and flexibility to respond to the audience by presenting points that are appropriate for the audience at a depth that is appropriate for the audience.

In some implementations, the modules 114, 116, or 118 may generate a graphical user interface that enables a user to specify details associated with the presentation, such as a title, one or more points, and one or more graphics for each portion (e.g., slide) of the presentation. In other implementations, a simple presentation markup language (PML) may be provided to enable a user to specify titles and points for each slide included in a presentation. An example of a PML that enables a user to specify details associated with the presentation is provided in Table 2. The PML described in Table 2 may support the development of high-level scenes illustrated with full-bleed images, the expansion of scenes into points, the expansion of points into sub-points, supporting files, media, and/or web pages, and the preparation of links between scenes.

TABLE 2

Presentation Markup Language (PML) Example

| Action | Syntax | Explanation |
| --- | --- | --- |
| Create scenes | [Scene 1 < image1.jpg]<br>[Scene 2 < image2.jpg] | Create scene slides with titles "Scene X" that have the background imageX.jpg. |
| Add details | [Scene 1 < image1.jpg]<br>[> Point A]<br>[>> Point A1]<br>[>> Point A2]<br>[> Point B] | Add Point A and Point B as details of Scene 1, with Point A1 and Point A2 sub-details of Point A. A third level of detail is possible using [>>> . . . ], and so on. |
| Add hyperlinks | [> Point A >> http://url.tld]<br>[> Point B >> anyfile.ext] | Link from Point A to a URL.<br>Link from Point B to a file. |
| Embed media | [> Point C > media.ext] | Embed image or video into a slide linked from Point C. |
| Add verbal linkages | [Scene 1]<br>{Linkage from Scene 1 to 2}<br>[Scene 2] | Add verbal linkage from Scene 1 to Scene 2 (see FIG. 1 for details). |
| Adjust styles | *styleParameter styleValue | Adjust visual properties (fonts, colors, spacing, etc.) |
| Add notes | This is a note. | Anything outside [ . . . ] or { . . . } is ignored. |

The PML of Table 2 may enable a presenter to specify a variety of style parameters, such as font types, colors of titles and body text, sizes and colors of title backgrounds (e.g., to create contrast when overlaid on a background image), the aspect ratio of the slide, a background color, other style-related parameters, or any combination thereof. The modules 114, 116, and 118 may automatically (e.g., without human interaction) scale slide titles to fill the space available in each slide. The modules 114, 116, and 118 may enable the adjustment of links between a slide and other slides in the presentation. For example, in some cases, a transparent linkage box may be added to zero or more edges of the four edges of each slide. Each linkage box may be used to hyperlink a particular slide to one or more other slides of the presentation to create an interconnected slide network. The hyperlinks may provide a mechanism for dynamic navigation between slides when the presentation is being presented. For example, the hyperlinks may be navigated using a mouse or using a touchscreen. When using a touchscreen, one or more of the applications 114, 116, or 118 may interpret directional swipe gestures as navigation commands.

A presentation, such as the presentation 120 of FIG. 1, may be generated using one or more of the modules 114, 116, or 118 by specifying details of the presentation at a story level 202, a scene level 204, and a detail level 206. At the story level 202, a user may define scenes, such as one or more of a first scene 208, a second scene 210, a third scene 212, or a fourth scene 214. The scenes 208, 210, 212, and 214 may be displayed in a thumbnail view to enable the user to select a particular scene and link the particular scene with one or more other scenes. For example, the user may select the first scene 208 and add links from the first scene 208 to the second scene 210. The user may then select another of the scenes 208, 210, 212, or 214 and add links from the selected scene to other scenes and so on. In the thumbnail view, a selected scene may provide a visual indication that the scene has been selected, such as by displaying a darker border (as illustrated in FIG. 2), a flashing border, or other visual indicator.

The scene level 204 illustrates how the first scene 208 is horizontally linked to the second scene 210 and the second scene 210 is horizontally linked to the third scene 212. The scene level 204 may enable the user to add a top level point, such as a first title and first image 218 to the first scene 208, a second title and second image 220 to the second scene 210, and a third title and a third image 222 to the third scene. Clicking the top border of a scene may cause a jump to a hyperlinked "storyline" slide with the outbound scene highlighted. From a sequence of scene described by the user, an overview of all scenes may be automatically created by one or more of the modules 114, 116, or 118 to support non-linear navigation and visual reference to the presentation structure. The presentation structure may be created by statically hyper-linking slides to one another, with different overview slides created with different scenes highlighted according to the outbound scene. A similar presentation structure may be achieved through navigation and highlights interpreted dynamically at presentation runtime (e.g., by the application). Clicking on a particular scene thumbnail may cause the presentation to jump directly to the particular scene, while horizontal navigation may display the links between scenes providing a story rehearsal path for preparing the presentation. Clicking on a bottom portion of a scene being displayed may display the high level points for the scene. For example, in response to the user clicking the bottom portion of the scene, the high level points may be displayed using a drop down menu. If the user causes the high level points to be displayed (e.g., rather than speaking about just the displayed scene), the user may navigate back to the scene level 204 before advancing to a next slide. Such a mechanism may enable the presenter to provide closure to each scene while prompting the presenter to verbally convey a previously prepared verbal linkage without displaying text that competes for the audience's attention.

The detail level 206 may enable the user to add internal hyperlinks and/or external hyperlinks. The details may not be added in a detail view, but the detail level 206 may be realized through hyperlinked bullets generated from hierarchically-related points (as well as points connected manually in a free-form structure). For example, at the detail level 206, the user may add a hyperlink to any of the points 126. The hyperlink may be used to link to an external file, a web page, or another type of content that is external to the presentation 120. The hyperlink may be used to link a point or a slide to other points, slides, descriptions, media data (e.g., image data, video data, audio data, etc.), or other material that is included in the presentation 120. Once a point has been expanded, clicking on the top border of the each slide may enable the user to navigate back up the hierarchy. Navigating horizontally at the detail level 206 may enable the user to follow a detailed rehearsal path, performing a depth-first traversal of all expandable points in the presentation, with "cue" slides indicating which points may be expanded. The presenter may repeatedly traverse the rehearsal path until the structure of the presentation and the content of each of the points can be recalled. The modules 114, 116, or 188 may automatically generate slide notes to show scene linkages and previews of point expansions.

To generate the presentation 120, an input file including PML commands, an input text file, and any hyperlinked files or media that are to be embedded into the presentation 120 may be placed in a folder. Providing the input file that includes the PML commands to an application (e.g., one or more of the modules 114, 116, or 118) may generate/regenerate the presentation 120, which may automatically be opened in an installed presentation application' such as Microsoft® PowerPoint®. An example of an input file may appear as:

{A new way to think about presentations}
^ opening verbal introduction
[Presenting with HyperSlides<Presenting.jpg]
^ title and image of scene 1
[>Dynamic Presentation Prototyping]
[>>Dynamic Prototyping of Presentations]
[>>Prototyping of Dynamic Presentations]
[>Practical Guidance>PresentationZen.jpg]
[>Empirical Grounding>>GroundedTheoryStudy.docx]
^ hyperlinked bullets, slides, and files of scene 1
{Presentation slides are prototyped dynamically}
^ verbal transition to scene 2
[Authoring<Prototyping.jpg]
[>Setting Goals given Constraints]
[>Telling Stories with Slides]
[>Planning with Points]
[>Styling as a Service]
[>Linking between Scenes]
{Presentation links are rehearsed dynamically}
[Rehearsal<Rehearsing.jpg]
[>Preparing for Structured Spontaneity]
[>Linking between Scenes]
[>Expanding on Demand (to learn the story)]
{Presentation itself is delivered dynamically}
[Delivery<Delivering.jpg]
[>Orchestrating Focus and Flow]
[>Influencing Audience with Timing]
[>Expanding on Demand (to tell the story)]
{Rapid iterative prototyping of flexible presentations}
^ closing verbal takeaway message
Example Processes In the flow diagrams of FIGS. 3-6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, 500, and 600 are described with reference to the architectures 100 and 200 as described above, although other models, frameworks, systems and environments may implement these processes.

Figure 3:
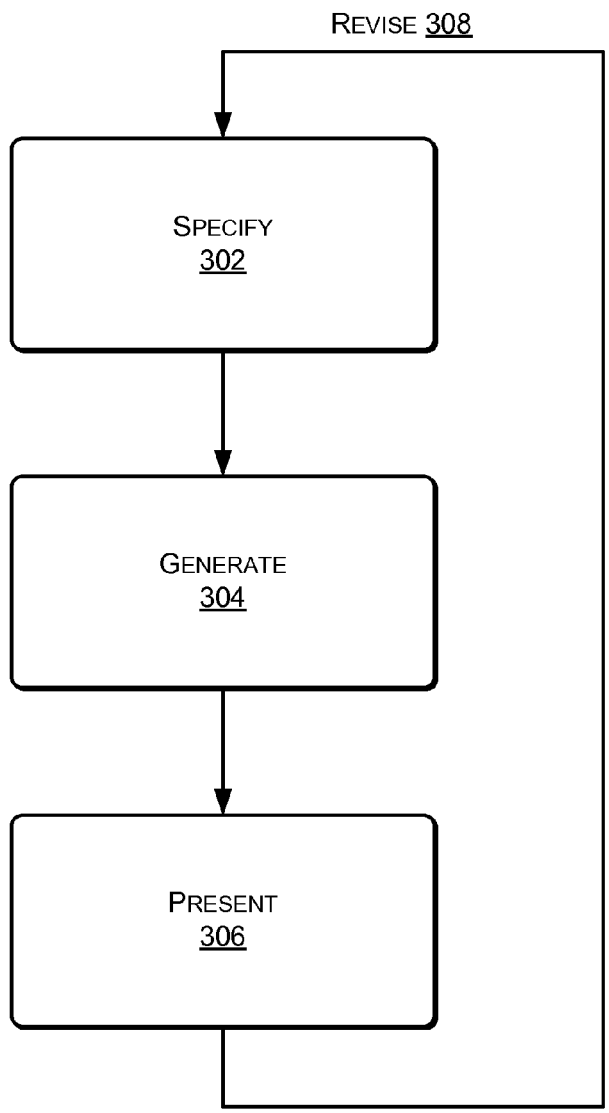
FIG. 3 is a flow diagram of an example process that includes specifying and revising a presentation according to some implementations.

FIG. 3 is a flow diagram of an example process that includes specifying and revising a presentation according to some implementations. The architecture 300 describes how a user may create and refine a presentation.

At 302, the user may specify one or more aspects of a presentation. For example, in FIG. 1, the user may specify different components of the presentation 120, such as one or more of the points 126, the text 128, the images 130, the media data 132, or the links 134 using a PML, (e.g., the PML illustrated in Table 1) or a GUI provided by one or more of the modules 114, 116, or 118.

At 304, the user may generate the presentation. For example, in FIG. 1, the user may use the generation module 116 to generate the presentation 120.

At 306, the user may present the presentation. For example, in FIG. 1, the user may use the presentation module 118 to display the presentation 120 on the display device 108. The user may rehearse the presentation using a rehearsal mode of the presentation module 118 and deliver the presentation 120 to an audience using a delivery mode of the presentation module 118.

During the rehearsal mode, if the user desires to modify one or more aspects of the presentation 120, the user may return to 302 to further revise 308 the presentation 120. Thus, 302, 304, 306, and 308 may be repeated until the user is satisfied with the resulting presentation 120.

Figure 4:
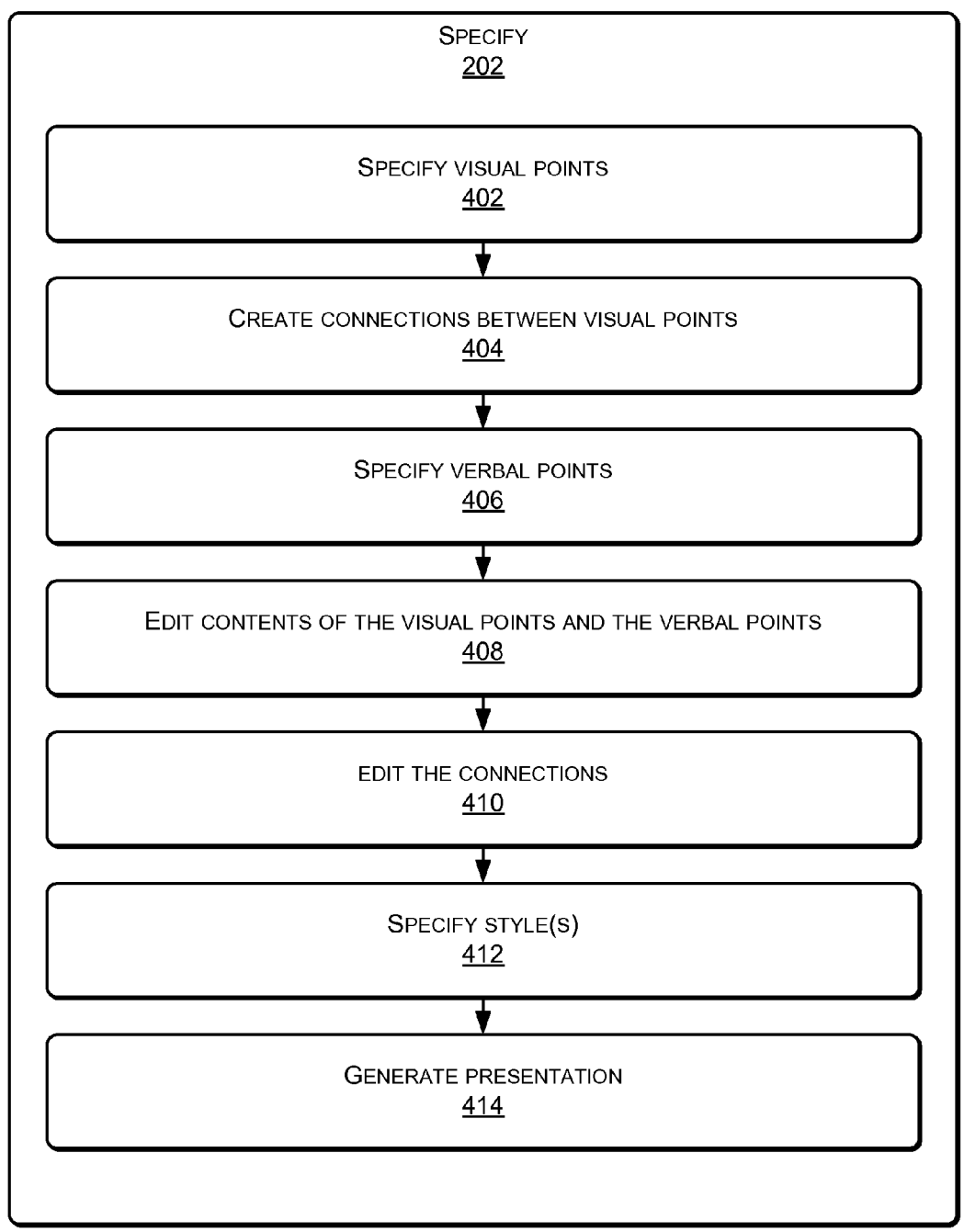
FIG. 4 is a flow diagram of an example process that includes specifying details associated with a presentation according to some implementations.

FIG. 4 is a flow diagram of an example process that includes specifying details associated with a presentation according to some implementations. For example, the process 400 may be performed by the authoring module 114 of FIG. 1.

At 402, visual points may be specified. A visual point may be an idea that is to be conveyed visually using the presentation, e.g., using one or more slides or media data from the presentation.

At 404, connections between the visual points may be created. For example, in FIG. 1, the authoring module 14 may be used to include visual points that are connected vertically, horizontally, hierarchically, linearly, non-linearly, circularly, or any combination thereof in the presentation 120.

At 406, verbal points may be specified. A verbal point may be an idea that is to be conveyed verbally by the presenter. For example, a verbal point may be used to introduce the presentation, to transition from one slide to another slide during the presentation, or to make another type of point. In FIG. 1, the authoring module 114 may be used to add cues (e.g., text, images, and/or media data) to prompt the presenter to convey verbal points.

At 408, the contents of the visual points and the verbal points may be edited. For example, in FIG. 1, the authoring module 114 may be used to specify one or more of text, images, or media data in the contents of the visual points and/or the verbal points.

At 410, styles associated with the presentation may be specified. For example, in FIG. 1, the authoring module 14 may be used to specify styles associated with each of the slides 122 to 124, such as fonts, colors, background images, foreground images, or other styles associated with presentations.

At 412, the presentation may be generated. For example, in FIG. 1, the generation module 116 may be used to generate the presentation 120 after the user has completed specifying the contents of the presentation 120. To illustrate, the user may use the authoring module to author a presentation using a PML (e.g., the PML illustrated in Table 1), a graphical user interface, or other authoring tool and then generate the presentation 120 using the generation module 116 based on the authoring. The user may review the generated presentation and repeat one or more of blocks 402, 404, 406, 408, 410, or 412 until the user is satisfied with the resulting presentation.

A presentation may be viewed as a set of points to be communicated through visuals with or without accompanying speech. The points may be made in the presentation using text, images, media data, or other forms of media such as diagrams, photos, videos, web pages, etc. A particular point may be followed by related points at the same level of abstraction as the particular point, or by secondary points (e.g., sub-points) that expand on the particular point by providing more details, evidence, or examples. Some points may be grouped at higher levels, leading to a hierarchical structure in which the points at a particular level may be ordered to achieve a particular effect (e.g., the presentation of an argument). A presentation may include a hierarchy in which a title slide is the root, while remaining slides may be children of the root. Similarly, the bullets and other non-title visual elements of a slide may be the children of the title, and the notes of the slide may be children of slide elements or the slide title. When using a conventional presentation generation application, once a user has committed to a particular hierarchical structure, modifying the structure may be difficult and/or time consuming. For example, the user may spend a large amount of time (e.g., several minutes) to convert a slide to a bullet or vice-versa. In contrast, the authoring module 114 may enable the user to specify logical relationships (e.g., sequence, transition, hierarchy, and the like) between points without committing to any arrangement or styling. To modify the structure of a presentation, the user merely modifies the relationship between points and re-generates the presentation using the generation module 116. Thus, the structure of the presentation 120 may be altered in a few seconds using the authoring module 114 as compared to a few minutes to alter the structure using a conventional presentation generation application.

In addition to the text and media content of the points themselves, the authoring module 114 may enable the user to specify a visual theme for the presentation 120. The visual theme may include fonts and colors to be used for the presentation as well as spatial layout rules for the arrangement of points. Thus, the generation of the presentation 120 using the generation module 116 may go beyond direct manipulation of object placement (e.g., as per the What You See Is What You Get (WYSIWYG) paradigm) to support an automated layout guided by principles of graphic and narrative design.

The presentation 120 may be specified using a simple markup language (e.g., similar to the PML of Table 1) or through a graphical editor that supports the hierarchical layout, styling, and restructuring of points (e.g., using a What You See Is What You Mean (WYSIWYM) paradigm). Thus, the modules 114, 116, or 118 may support assembling the presentation 120 from portions of different presentations because the combined points from the different presentations may be easily restyled to form one consistently styled presentation.

Figure 5:
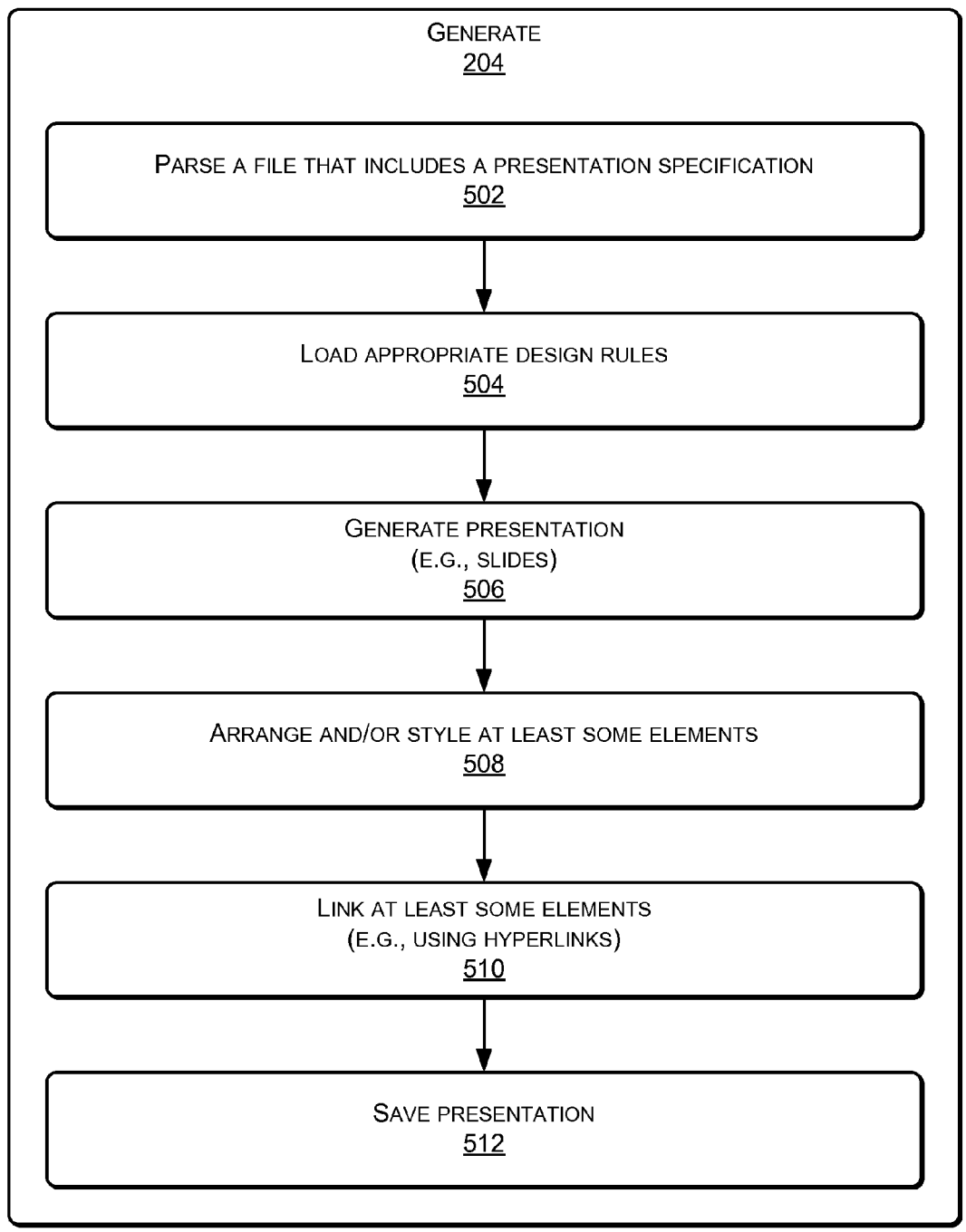
FIG. 5 is a flow diagram of an example process that includes generating a presentation based on a specification according to some implementations.

FIG. 5 is a flow diagram of an example process that includes generating a presentation based on a specification according to some implementations. For example, the process 500 may be performed by the generation module 116 of FIG. 1.

At 502, a file that includes a presentation specification may be parsed. For example, the file may include PML commands (e.g., from Table 1) that specify details associated with a specification that is to be generated. The file may be generated by the user or by a graphical user interface provided by the authoring module 114.

At 504, appropriate design rules may be loaded. The design rules may map an abstract presentation structure (e.g., points, scenes, and their corresponding relationships) into various representational forms, e.g., slides, web pages, handouts, canvas layouts and the like. The design rules may include styling principles as proportional spacing, in which the points of a slide are distributed equally across the height of the slide or the child points surrounding a parent point in a spatial canvas layout are placed at equal angular intervals around the parent point. The styling principles may be used to automatically create aesthetic layouts in terms of the relative sizes and distances between presentation points. For example, the golden ratio 1.618 may be used to scale font sizes and inter-point spacing across levels of a presentation point hierarchy. Calculating the visual weight of visual elements (e.g., amount of inked type) and the corresponding centers of mass of the visual elements may provide visual representations that are balanced with respect to the center of the display. The stylistic and spatial relationships between visual elements may vary in accordance with the actions of the presenter while being constrained by the design rules.

At 506, the presentation may be generated. For example, in FIG. 1, the generation module 116 may be used to generate the presentation 120.

At 508, at least some elements of the presentation may be arranged and/or styled. For example, in FIG. 1, the user may review the generated presentation 120, tweak one or more elements of the presentation 120 by modifying an arrangement of the points, a style associated with the presentation 120, or both.

At 510, at least some elements may be linked. For example, in FIG. 1, the user may link at least some elements of the presentation 120 by linking points or slides with others points or slides in the presentation 120 or by adding hyperlinks to content external to the presentation 120, such as external files, internet sites, etc.

At 512, the presentation may be saved. For example, in FIG. 1, once the user has generated the presentation 120 and is satisfied with the generated presentation 120, the user may save the presentation 120 (e.g., in the computer readable media 112 or 132).

Thus, the modules 114, 116, or 118 may enable a content and story-centered approach to specifying the presentation 120. In addition, the modules 114, 116, or 118 may enable the generation of multiple media representations of a particular presentation. For example, using the same authored input file produced by the authoring module 114, the generation module 116 may be used to generate different types of presentations, such as a set of web pages suitable for display on a website, a slide deck (e.g., Microsoft® PowerPoint™) for display using a computing device, a canvas layout (e.g., Microsoft® Expression Studio™), a slide deck suitable for display on a computing device with display constraints (e.g., tablet device or mobile phone), a video (e.g., a movie), or some other presentation medium.

The generation module 116 may generate the presentation 120 with a structure of points that supports complex navigation such that the presenter can dynamically create a presentation tailored for a particular audience while presenting the presentation. For example, based on information (e.g., current events), audience comments and/or questions, or the like, the presenter can navigate the presentation 120 to go into more depth on some points while skipping or skimming over other points, without the audience being aware that the presenter is dynamically customizing the presentation 120. The presentation 120 may be created by compiling the presentation specification into an extensible markup language (XML) of a document format using software tools, such as an Open XML software development kit (SDK). In some implementations, the slides 122 to 124 may include a title, bullet points, media content, and spatial regions (e.g., slide borders) that support hyperlink-based navigation between the slides 122 to 124 according to the structure of the points in the presentation 120. The user may specify the structure of the points by specifying relationships between the points using the authoring module 114. The modules 114, 116, or 118 may enable hyperlink relationships between points to be quickly specified and modified.

Figure 6:
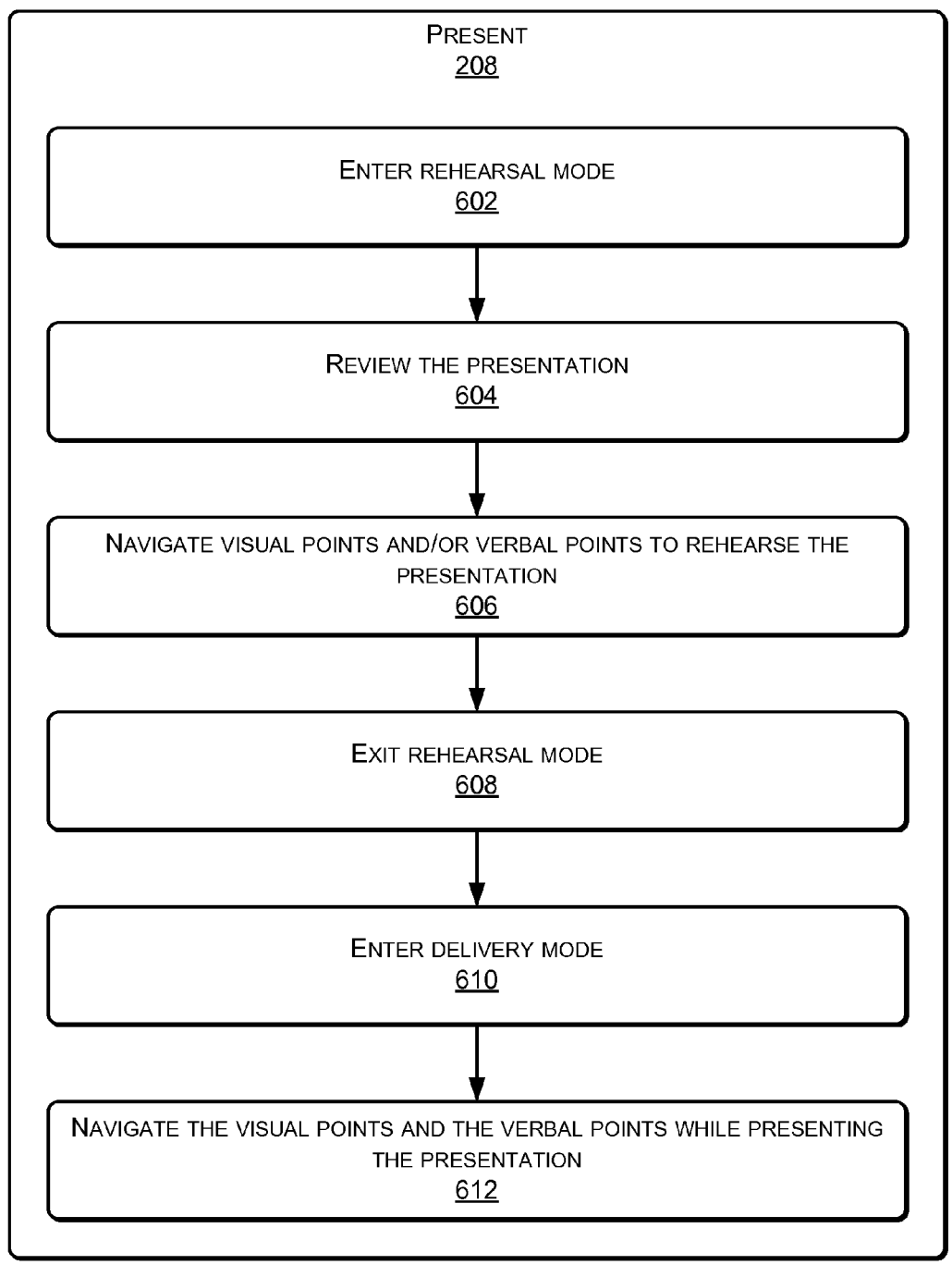
FIG. 6 is a flow diagram of an example process that includes presenting a presentation based on a specification according to some implementations.

FIG. 6 is a flow diagram of an example process that includes presenting a presentation based on a specification according to some implementations. For example, the process 600 may be performed by the presentation module 118 of FIG. 1.

At 602, a rehearsal mode may be entered. At 604, the presentation may be reviewed. At 606, visual points and verbal points in the presentation may be navigated to rehearse the presentation. At 608, rehearsal mode may be exited. For example, the user may use the presentation module 118 to enter a rehearsal mode to rehearse the presentation 120. In the rehearsal mode, the user may navigate the points 126, including verbal points and visual points, of the presentation 120. The rehearsal mode may be used to familiarize the presenter with the structure and flow of the presentation 120. After the presenter has completed rehearsing the presentation 120, the presenter may exit the rehearsal mode.

At 610, delivery mode may be entered. At 612, the visual points and/or the verbal points may be navigated while presenting the presentation. For example, in FIG. 1, the user may enter the delivery mode and present the presentation 120, including navigating the points 126 using the links 134. A delivery mode (or generated file) may not include some material prepared for rehearsal because some material may be intended for the speaker but not the audience (e.g., private notes).

Thus, the presentation module 118 may provide various modes, including a rehearsal mode in which the presenter can rehearse the presentation and a delivery mode in which the presenter can deliver the presentation.

Example Computing Device and Environment

Figure 7:
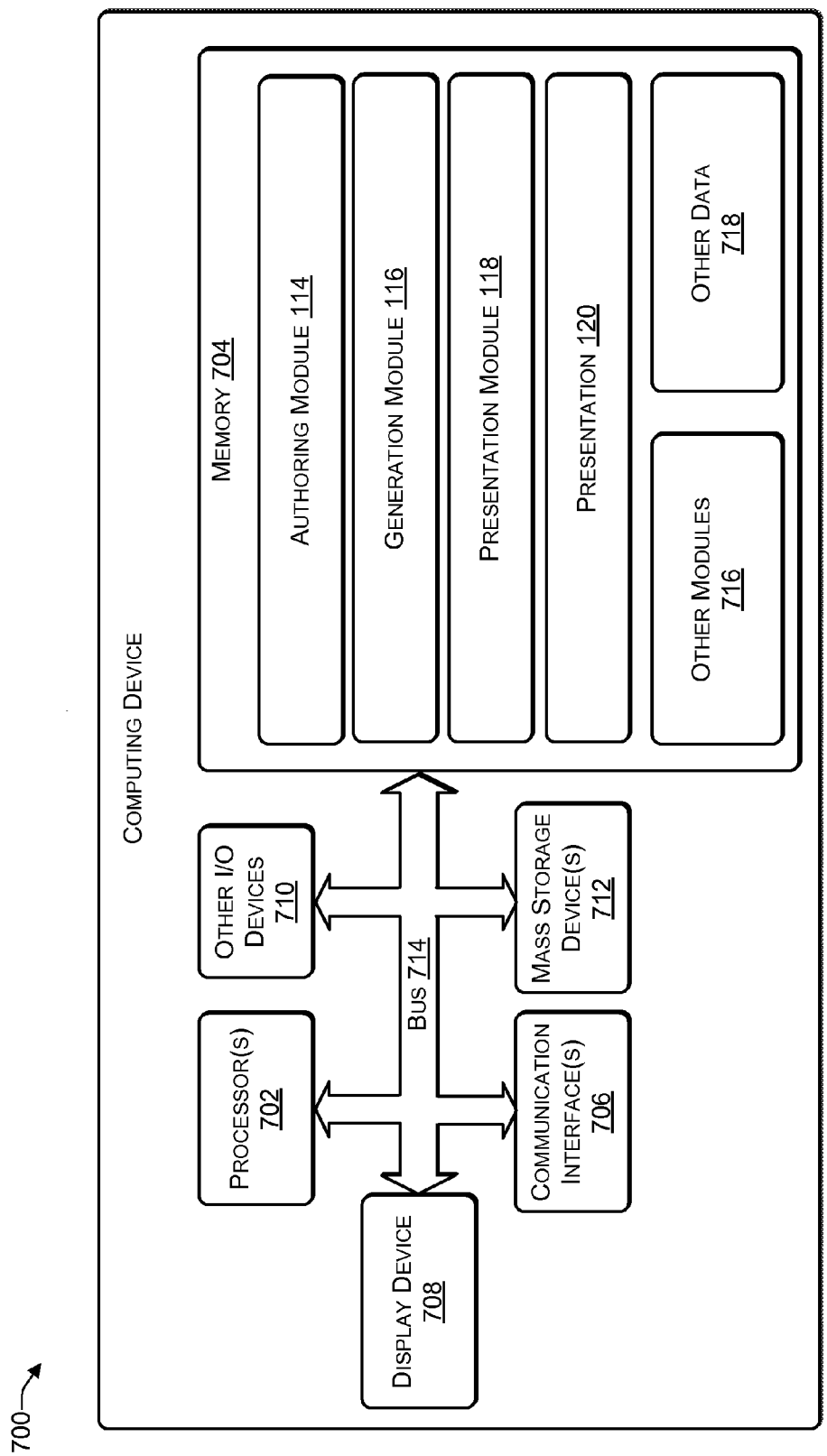
FIG. 7 illustrates an example configuration of a computing device and environment that can be used to implement the modules and functions described herein.

FIG. 7 illustrates an example configuration of a computing device 700 and environment that can be used to implement the modules and functions described herein. For example, the computing device 102 or the server 104 may include an architecture that is similar to or based on the computing device 700.

The computing device 700 may include one or more processors 702, a memory 704, communication interfaces 706, a display device 708, other input/output (I/O) devices 710, and one or more mass storage devices 712, able to communicate with each other, such as via a system bus 714 or other suitable connection.

The processor 702 may be a single processing unit or a number of processing units, all of which may include single or multiple computing units or multiple cores. The processor 702 may be implemented as one or more microprocessors, microcomputers, microcontrollers, digital signal processors, central processing units, state machines, logic circuitries, and/or any devices that manipulate signals based on operational instructions. Among other capabilities, the processor 702 may be configured to fetch and execute computer-readable instructions stored in the memory 704, mass storage devices 712, or other computer-readable media.

Memory 704 and mass storage devices 712 are examples of computer storage media for storing instructions, which are executed by the processor 702 to perform the various functions described above. For example, memory 704 may generally include both volatile memory and non-volatile memory (e.g., RAM, ROM, or the like). Further, mass storage devices 712 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 may be collectively referred to as memory or computer storage media herein, and may be capable of storing computer-readable, processor-executable program instructions as computer program code that can be executed by the processor 702 as a particular machine configured for carrying out the operations and functions described in the implementations herein.

Although illustrated in FIG. 7 as being stored in memory 704 of computing device 700, the authoring module 114, the generation module 116, the presentation module 118, the presentation 120, other modules 716 and other data 718, or portions thereof, may be implemented using any form of computer-readable media that is accessible by the computing device 700. As used herein, "computer-readable media" includes computer storage media and communication media.

Computer storage media includes non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave. As defined herein, computer storage media does not include communication media.

The computing device 700 may also include one or more communication interfaces 706 for exchanging data with other devices, such as via a network, direct connection, or the like, as discussed above. The communication interfaces 806 can facilitate communications within a wide variety of networks and protocol types, including wired networks (e.g., LAN, cable, etc.) and wireless networks (e.g., WLAN, cellular, satellite, etc.), the Internet and the like. Communication interfaces 806 can also provide communication with external storage (not shown), such as in a storage array, network attached storage, storage area network, or the like.

A display device 708, such as a monitor may be included in some implementations for displaying information and images to users. Other I/O devices 810 may be devices that receive various inputs from a user and provide various outputs to the user, and may include a keyboard, a remote controller, a mouse, a printer, audio input/output devices, voice input, and so forth.

Memory 704 may include modules and components for training machine learning algorithms (e.g., PRFs) or for using trained machine learning algorithms according to the implementations described herein. The memory 704 may include multiple modules (e.g., the modules 114, 116, and 118) to perform various functions. The memory 704 may also include other modules 716 that implement other features and other data 718 that includes intermediate calculations and the like. The other modules 716 may include various software, such as an operating system, drivers, communication software, or the like.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

What is claimed is:

1. A computer-implemented method, comprising:
   receiving scene input specifying a plurality of scenes associated with a presentation;
   receiving content input specifying a content of at least one scene of the plurality of scenes;
   generating, based at least in part on the scene input, the content input, and style input, the presentation comprising a plurality of slides having a hierarchical organization including a story level, a scene level, and a detail level; and
   generating, based at least in part on linkage information, a plurality of linkages, including:
      a first vertical linkage between a first slide at the story level and a second slide at the scene level; and
      a second vertical linkage between the second slide at the scene level and a third slide at the detail level.

2. The computer-implemented method as recited in claim 1, further comprising:
   receiving the linkage information linking a particular scene with one or more additional scenes of the plurality of scenes;
   receiving a plurality of points for inclusion in the particular scene; and
   receiving structure information associated with the plurality of points, wherein the plurality of points are organized based on the structure information in the presentation.

3. The computer-implemented method as recited in claim 1, further comprising:
   receiving navigation input while the presentation is being presented; and
   dynamically displaying a specified portion of the presentation based on the navigation input without displaying other portions of the presentation.

4. The method as recited in claim 1, wherein the scene input, the linkage information, the content input, and the style input are specified in an input file using commands from a presentation markup language.

5. The computer-implemented method as recited in claim 1, further comprising:
   determining that the style input was not received; and
   selecting a default style as the style input.

6. A computing device comprising:
   one or more processors;
   one or more computer-readable storage media storing instructions executable by the one or more processors to perform acts comprising:
      receiving point input specifying a plurality of visual points associated with a presentation;
      receiving linkage input specifying one or more connections between at least two points of the plurality of visual points;
      receiving content input specifying contents of at least one of the plurality of visual points;

receiving one or more edits associated with the presentation;

editing one or more of the plurality of visual points, the one or more connections, or the contents of at least one of the plurality of visual points based on the one or more edits;

generating the presentation based on the point input, the linkage input, the content input, and the one or more edits, the presentation comprising a plurality of slides having a hierarchical organization including a story level, a scene level, and a detail level; and generating, based at least in part on the linkage input, a plurality of linkages, including:
  a first vertical linkage between a first slide at the story level and a second slide at the scene level; and
  a second vertical linkage between the second slide at the scene level and a third slide at the detail level.

7. The computing device as recited in claim 6, the acts further comprising:
  entering a rehearsal mode in response to receiving an enter rehearsal mode command;
  displaying one or more navigation controls to navigate the presentation; and
  exiting the rehearsal mode in response to receiving an exit rehearsal mode command.

8. The computing device as recited in claim 6, wherein the generating the presentation comprises:
  determining a default style in response to determining that style input was not received; and
  generating the presentation based on the default style.

9. The computing device as recited in claim 6, wherein the generating the presentation comprises:
  receiving style input specifying a style for the presentation; and
  generating the presentation based on the style input.

10. The computing device as recited in claim 6, wherein:
  the point input and the linkage input are specified in an input file using commands from a presentation markup language; and
  the generating the presentation comprises:
    parsing the input file for the commands; and
    generating the presentation based on the commands in the input file.

11. The computing device as recited in claim 6, wherein the point input and the linkage input are specified using a graphical user interface.

12. A method comprising:
  under control of one or more processors configured with executable instructions to perform acts comprising:
    parsing an input file comprising commands from a presentation markup language;
    creating a plurality of slides having a hierarchical organization including a story level, a scene level, and a detail level;
    generating, based at least in part on the input file, a plurality of linkages, including:
      a first vertical linkage between a first slide at the story level and a second slide at the scene level; and
      a second vertical linkage between the second slide at the scene level and a third slide at the detail level;
    adding one or more points to at least one slide of the plurality of slides based on the commands;
    adding a hyperlink to access a website to at least one slide of the plurality of slides based on the commands;
    embedding media data into at least one slide of the plurality of slides based on the commands; and
    applying a style specified by one of the commands to at least one of the plurality of slides.

13. The method as recited in claim 12, the acts further comprising:
  displaying the presentation;
  displaying a navigation interface;
  receiving a selection of navigation control; and
  modifying a display of the presentation based at least in part on the selection.

14. The method as recited in claim 12, the acts further comprising adding a verbal linkage cue to at least one of the plurality of slides based on the commands.

15. The method as recited in claim 12, wherein the media data comprises at least one of audio data or video data.

16. The method as recited in claim 12 the acts further comprising adding a note to at least one of the plurality of slides based on the commands.

17. The method as recited in claim 12, wherein:
  a first slide of the plurality of slides originated from a first presentation having a first style;
  a second slide of the plurality of slides originated from a second presentation having a second style; and
  the plurality of slides have a third style that is different from both the first style and the second style.

18. The method as recited in claim 12, the acts further comprising linking one slide of the plurality of slides to at least one other slide of the plurality of slides.

19. The method as recited in claim 12, the acts further comprising:
  initiating presenting the presentation;
  receiving navigation input; and
  dynamically displaying a specified portion of the presentation based on the navigation input without displaying other portions of the presentation.

20. The method as recited in claim 12, wherein the input file includes commands in the presentation markup language that describe the hierarchical organization of the plurality of slides.

* * * * *

UNITED STATES PATENT AND TRADEMARK OFFICE
CERTIFICATE OF CORRECTION

PATENT NO. : 9,619,128 B2  
APPLICATION NO. : 13/933030  
DATED : April 11, 2017  
INVENTOR(S) : Darren Keith Edge et al.

Page 1 of 1

It is certified that error appears in the above-identified patent and that said Letters Patent is hereby corrected as shown below:

On the Title Page

Column 1, item (71), change "Applicant" to -- Microsoft Technology Licensing, LLC., Redmond, WA (US) --.

Signed and Sealed this
Fourth Day of July, 2017

Joseph Matal
*Performing the Functions and Duties of the
Under Secretary of Commerce for Intellectual Property and
Director of the United States Patent and Trademark Office*